United States Patent [19]
Helling et al.

[11] Patent Number: 4,762,777
[45] Date of Patent: Aug. 9, 1988

[54] POLYUREA AND POLYURETHANE COMPOUNDS CONTAINING A PHOTOGRAPHICALLY USEFUL GROUP, AND A PHOTOGRAPHIC RECORDING MATERIAL CONTAINING SUCH COMPOUNDS

[75] Inventors: Güter Helling, Odenthal; Helmut Reiff; Friedrich-Wilhelm Kunitz, both of Leverkusen, all of Fed. Rep. of Germany

[73] Assignee: Agfa-Gevaert AG, Leverkusen, Fed. Rep. of Germany

[21] Appl. No.: 112,056

[22] Filed: Oct. 20, 1987

Related U.S. Application Data

[63] Continuation of Ser. No. 804,481, Dec. 4, 1985, abandoned.

[30] Foreign Application Priority Data

Dec. 15, 1984 [DE] Fed. Rep. of Germany ....... 3445790

[51] Int. Cl.$^4$ .......................... G03C 7/26; G03C 7/32; G03C 1/04
[52] U.S. Cl. .................................... 430/548; 430/215; 430/223; 430/551; 430/559; 430/627; 430/630; 430/566; 430/955; 430/957

[58] Field of Search ............... 430/213, 215, 548, 559, 430/566, 627, 630

[56] References Cited

U.S. PATENT DOCUMENTS

| | | | |
|---|---|---|---|
| 2,671,021 | 3/1954 | Kleiger et al. | 430/548 |
| 3,307,948 | 3/1967 | Thiers et al. | 430/627 |
| 3,791,857 | 2/1974 | Balle et al. | 430/627 |
| 4,186,014 | 1/1980 | Bergthaller et al. | 430/213 |

*Primary Examiner*—Richard L. Schilling
*Attorney, Agent, or Firm*—Connolly and Hutz

[57] ABSTRACT

Photographically useful compounds, i.e. in the present context compounds which, under development conditions, chemically react imagewise, after imagewise exposure, to produce desired reaction products in imagewise distribution, may be incorporated in the layers of photographic recording materials in the form of aqueous dispersions of polyurea or polyurethane compounds containing recurring structural units corresponding to the following formula:

$$Q(-Y)_n \qquad\qquad I$$

in which Q represents the residue of the photographically useful compound; the other symbos are as defined in the specification.

4 Claims, No Drawings

POLYUREA AND POLYURETHANE COMPOUNDS CONTAINING A PHOTOGRAPHICALLY USEFUL GROUP, AND A PHOTOGRAPHIC RECORDING MATERIAL CONTAINING SUCH COMPOUNDS

This application is a continuation of application Ser. No. 804,481, filed Dec. 4, 1985, now abandoned.

This invention relates to new polyadducts and polycondensates containing the residue of a photographically useful compound and to a photographic recording material comprising at least one photosensitive silver halide emulsion layer and at least one of those new polyadducts or polycondensates.

Photographic recording materials are known to have an extremely complicated structure and generally contain a number of inorganic and organic constituents. Among these constituents, compounds which are initially present in uniform distribution in the recording material, but which after imagewise exposure and under the development conditions are subjected to an imagewise chemical reaction to produce desired colored or non-colored reaction products in imagewise distribution, deserve particular mention. Compounds of this type are referred to hereinafter as photographically useful compounds. Photographically useful compounds in the context of the invention are, for example, photographic couplers which, in consequence of a coupling reaction with developer oxidation products, are capable of forming colored or non-colored coupling products, optionally with release of part of a molecule, which is capable of contributing towards the composition of the image either directly, for example as a dye, or indirectly, for example as a development inhibitor or development accelerator. Other photographically useful compounds in this context are, for example, compounds (photographic redox compounds) which, in consequence of an electron transfer, are capable of releasing part of a molecule which is able to contribute directly or indirectly towards the composition of the image. Examples of photographic couplers are color couplers (for example yellow, magenta, cyan couplers), white couplers, masking couplers, DIR couplers. Examples of photographic redox compounds are oxidizable or reducible compounds which are capable of releasing a dye as a result of oxidation or reduction (dye releasers).

In general, the photographically useful compounds are desired not to diffuse in the layers of the photographic recording materials. To this end, they are normally provided with ballast groups, for example linear or branched alkyl groups containing from 8 to 20 carbon atoms. It is also known that the photographically useful compounds may be used in the form of polymer dispersions in which the functional group of the photographically useful compound is attached once or repeatedly to a polymer structure and, in this way, is prevented from diffusing. Accordingly, a polymer of the type in question contains recurring structural units with the functional groups of the particular photographically useful compound.

Photographically useful compounds incorporated in the layers of photographic recording materials in the form of polymer dispersions of the type in question are generally sufficiently resistant to diffusion and have little effect on the mechanical properties of the layers, even despite low binder contents. If the photographically useful compounds are colour couplers, it is particularly important that they should not crystallize out during storage and should show high stability to light, heat and moisture and that the dyes produced from them should also be stable, should show the desired spectral properties and should be deposited during development, in diffusion-fast and very fine-grained form. Color couplers incorporated in photographic recording materials in the form of polymer dispersions of the type in question having a molecular weight above 5000 generally show good colloid stability and satisfy some of the above-mentioned demands imposed on them. High molecular weight color couplers are described, for example in DE-C-1 297 417, DE-A-2 407 569, DE-A-3 148 125, DE-A-3 217 200, DE-A-3 320 079, DE-A-3 324 932, DE-A-3 331 743, DE-A-3 340 376, EP-A-27 284 and in U.S. Pat. No. 4,080,211. The high molecular weight color couplers are generally produced by polymerization of ethylenically unsaturated, so-called monomeric color couplers. However, they have disadvantages at least insofar as comparatively large quantities of emulsifier (for example 5-8%, based on the polymeric coupler) are required for their production, resulting in undesirable foaming during processing with the further result that the layers cast with polymer dispersions such as these frequently show spot faults, streaks or other coating defects.

In order to reduce the tendency towards foaming, it has been recommended to use copolymerizable emulsifiers (DE-A-2 407 569, EP-A-27 284). However, the problem could not be satisfactorily solved in this way, because residues of the monomeric emulsifier used or if its hydrolysis products formed during polymerization remain in the serum of the latex produced. In addition, the polymeric latex couplers produced by polymerization do not show adequate heat, moisture or UV stability of the image dyes formed during development. Another disadvantage of known high molecular weight color couplers is that although they promote greater wet scratch resistance than low molecular weight color couplers incorporated using oil formers, they also promote lower breaking strength of the photographic recording materials.

The object of the present invention is to provide photographically useful compounds, more especially photographic couplers or dye releasers, in the form of emulsifier-free polymer dispersions which show less tendency towards foaming and which, when incorporated in photographic colloid layers, give improved mechanical properties and do not produce any coating faults. In addition, if the photographically useful compounds are color couplers, the image dyes produced during development are intended to show increased stability to heat, moisture and UV light.

According to the invention, this object is achieved by new high molecular weight polyadducts and polycondensates which contain recurring structural units corresponding to the following formula $$Q(-Y)_n \qquad \qquad I$$

in which

Q represents the n-valent residue of a photographically useful compound,

Y represents —O— or —NR$^1$—,

R$^1$ represents H, C$_1$-C$_6$ alkyl, cycloalkyl or phenyl, n is an integer of from 2 to 4, preferably 2.

Q is the residue of a photographically useful compound as previously defined, namely a compound which, when incorporated in a photographic recording material comprising at least one photosensitive silver halide emulsion layer, reacts chemically imagewise under the development conditions, after imagewise exposure, to produce colored or non-colored reaction products in imagewise distribution. Accordingly, Q is, for example, the residue of a coupler or of a photographic redox compound which, according to the invention, has been given a sufficiently high molecular weight and thus made resistant to diffusion by attachment to a polymer structure.

The residues of couplers are both residues of standard 4-equivalent couplers and also residues of 2-equivalent couplers in whose case a smaller quantity of silver halide is required for dye formation. 2-Equivalent couplers are known to be derived from the 4-equivalent couplers in that, in the coupling position, they contain a substituent which is split off during the coupling reaction. The 2-equivalent couplers include both those which are substantially colorless and also those which have a vivid natural color which disappears during the color coupling reaction or which is replaced by the color of the image dye produced. The latter couplers may serve as masking couplers to compensate the undesirable secondary densities of the image dyes. The 2-equivalent couplers also include the known white couplers, although white couplers do not produce a dye or reaction with color developer oxidation products and, accordingly, only contribute indirectly towards the composition of the dye image. The 2-equivalent couplers also include the known DIR-couplers, i.e. couplers which, in the coupling position, contain a releasable residue which is released as a diffusing development inhibitor on reaction with color developer oxidation products. Also other photographically useful compounds, such as nucleating or fogging agents which may act as development accelerators, or hardening agents or bleach catalysts may be released from such 2-equivalent couplers and thereby activated, optionally in diffusible form. As color couplers, the couplers are capable during development of forming yellow, magenta or cyan dyes of various color shades, according to their chemical structure. Because the structures in question are sufficiently familiar to the expert, they need not be explained in detail herein.

The residues of dye releasers may be residues of various types of compounds which are all distinguished by a chromophore and by a bond which is redox-dependent in its strength and which attaches the chromophore to an anchoring group. Said anchoring group, according to the invention, is fixed to the polymer structure responsible for diffusion resistance. Accordingly, compounds of this type contain a group corresponding to the following formula

—REDOX—DYE, in which
REDOX represents a redox-active group, i.e. a group which is oxidizable or reducible under alkaline development conditions and which undergoes an elimination reaction, a nucleophilic displacement reaction, a hydrolysis or any other splitting reaction to different extents, depending on whether it is present in oxidized from or in reduced form, with the result that the DYE residue is split off, and DYE represents the residue of a diffusible dye.

Redox-active groups and dye releasers containing redox-active groups are known in various forms. A detailed description can be found in the synoptic article by Christian C. Van de Sande in Angew. Chem. Int. Ed. Engl. 22 (1983), 191–209. Instead of a dye residue, the residue of a photographic redox compound represented by Q may of course contain any other releasable residue which is capable, optionally after imagewise release, of contributing indirectly towards composition of the image, for example a development inhibitor, a development accelerator or a compound capable of reacting with developer oxidation products in a reaction in which the latter are consumed.

Preferred examples of the polyadducts and polycondensates according to the invention contain recurring structural units corresponding to the following formula II

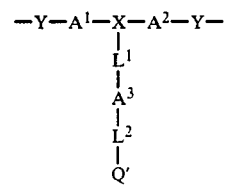

in which
Q' either on its own or together with X (with inclusion of $-L^1-A^3-L^2-$), represents the residue of a photographically useful compound, X represents

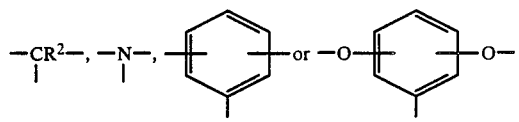

Y represents —O— or

$A^1$ and $A^2$ represents $C_1$–$C_4$ alkylene,
$A^3$ represents $C_1$–$C_8$ alkylene, arylene or a chemical bond,
$L^1$ represents —CONH—, —NHCO—, —CO—, $SO_2$—, —O— or a chemical bond,
$L^2$ represents —CONH—, —NH—, —O— or a chemical bond,
$R^1$ represents H, $C_1$–$C_6$ alkyl, cycloalkyl or phenyl,
$R^2$ represents H or $C_1$–$C_4$ alkyl.

The residues of photographically useful compounds represented by Q' in formula II are, basically, the same type of residues of photographically useful compounds as represented by Q and defined in formula I. The only real difference is that, in formula II, the photographically useful compound is connected to the polymer structure with both its connections through the same part of the molecule, whereas in formula I the connection is left open.

Suitable starting materials for the recurring structural units corresponding to formula I are compounds corresponding to the following general formula

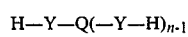      III in which Y, Q and n are as already defined.

Examples of these compounds are given in the following:
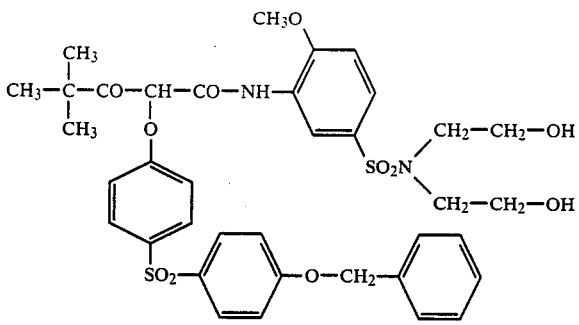
M-1
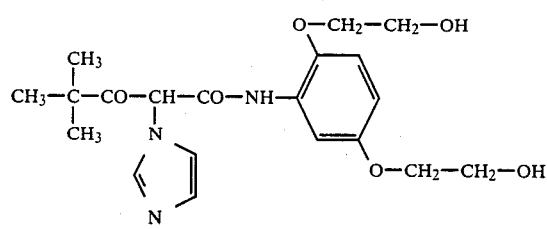
M-2
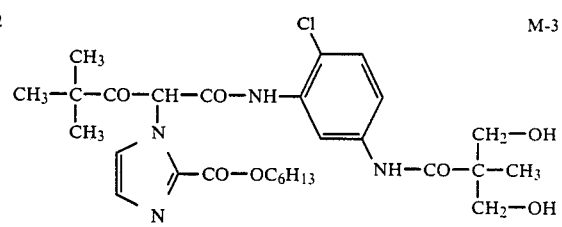
M-3
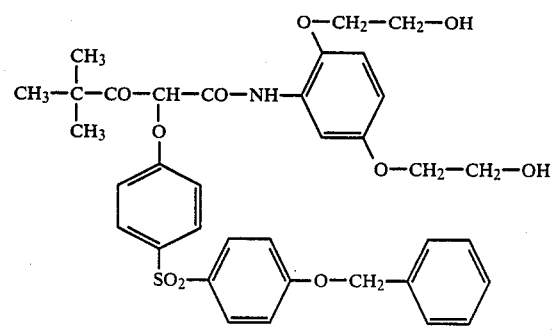
M-4
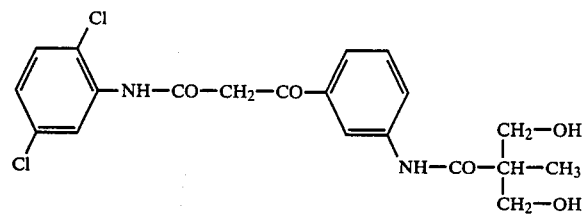
M-5
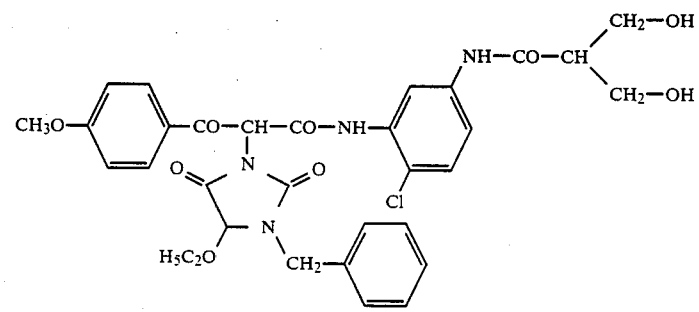
M-6

-continued
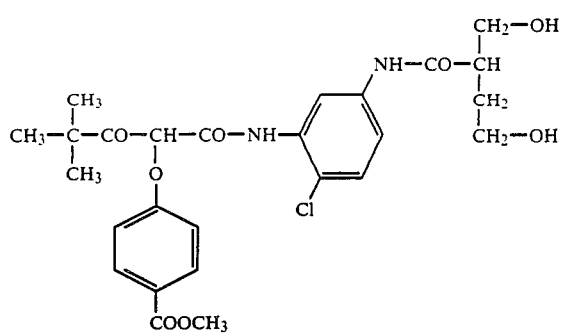
M-7
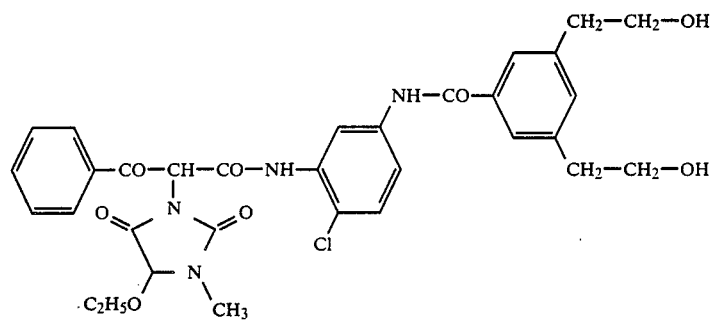
M-8
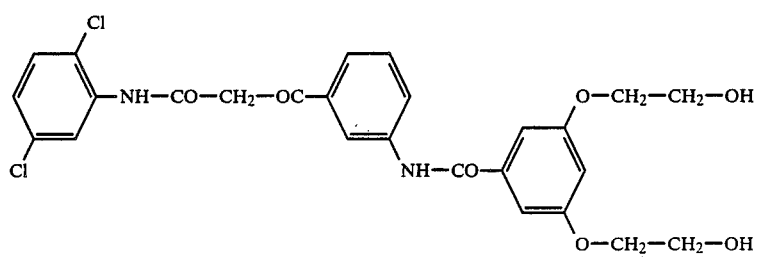
M-9
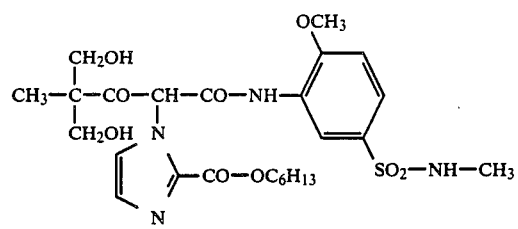
M-10
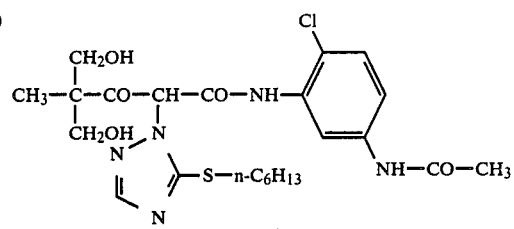
M-11
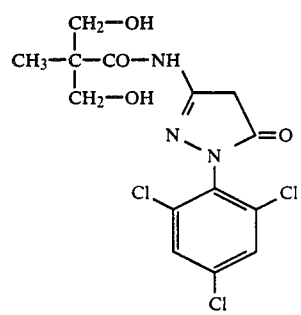
M-12
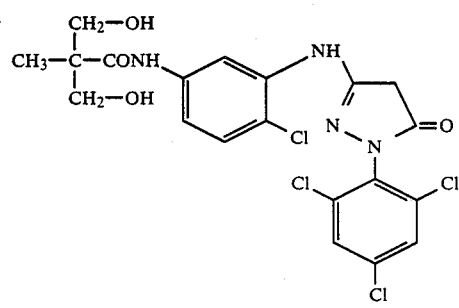
M-13

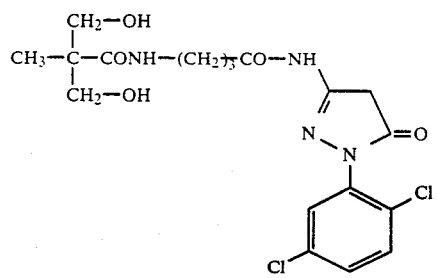 M-14
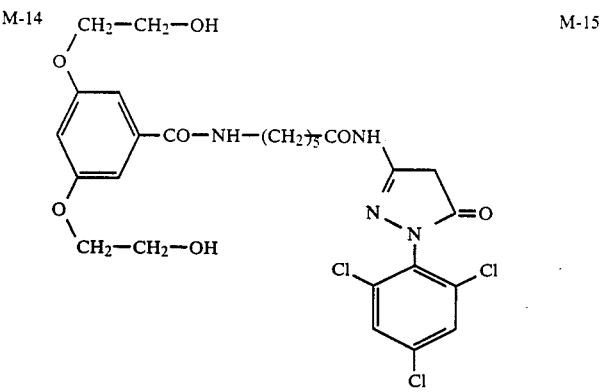 M-15
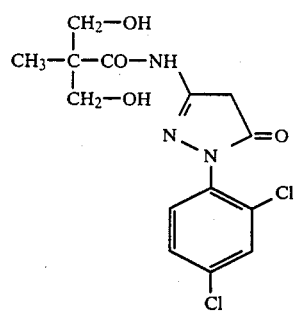 M-16
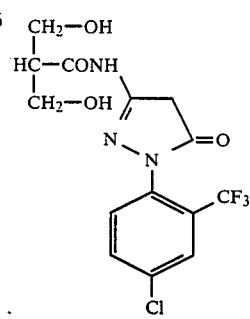 M-17
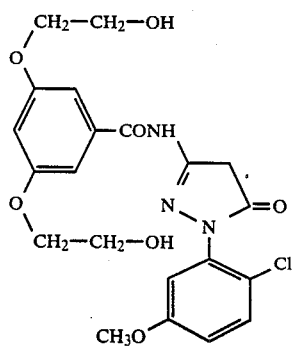 M-18
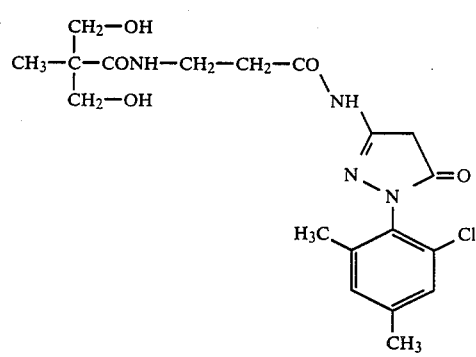 M-19
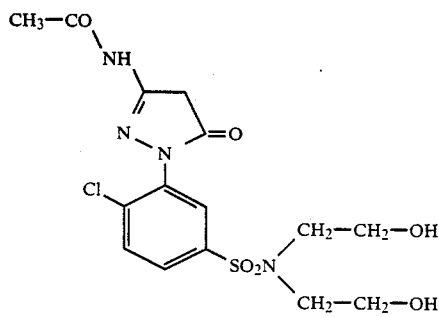 M-20
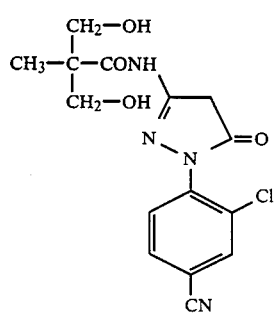 M-21

-continued
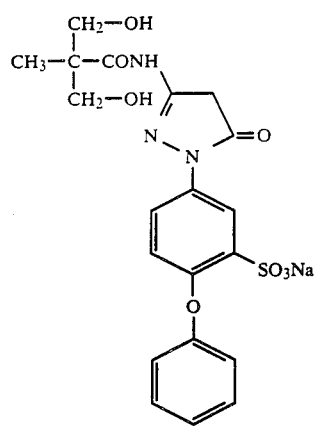 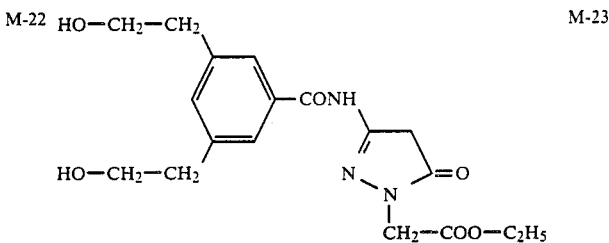
M-22　　　　　　　　　　M-23
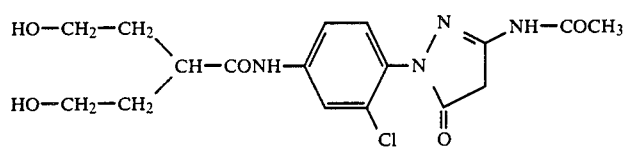
M-24
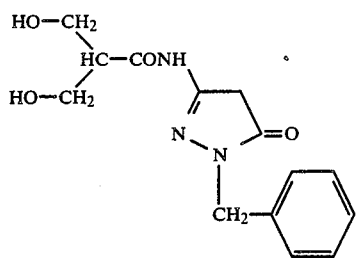 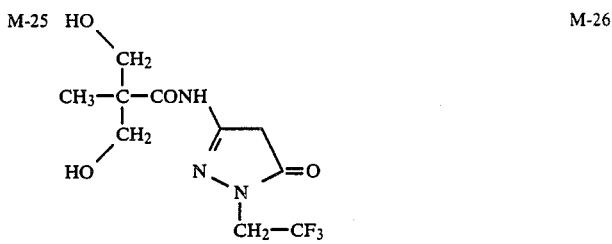
M-25　　M-26
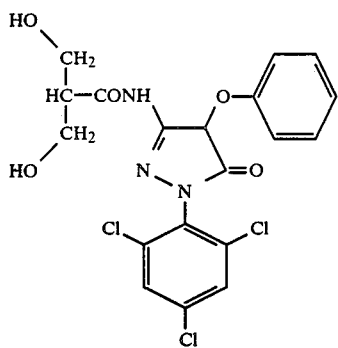 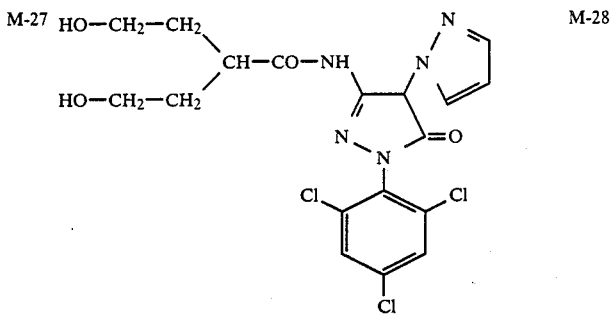
M-27　　M-28
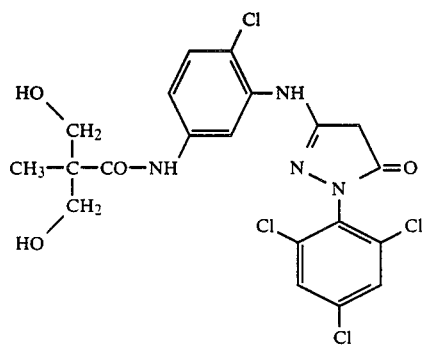 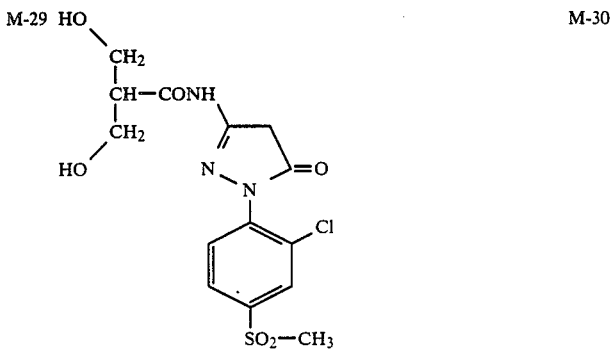
M-29　　M-30

-continued
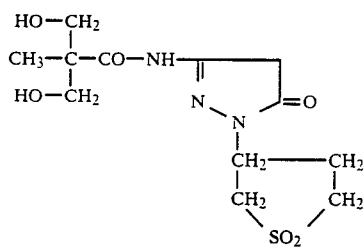 M-31
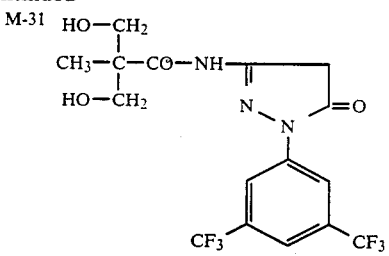 M-32
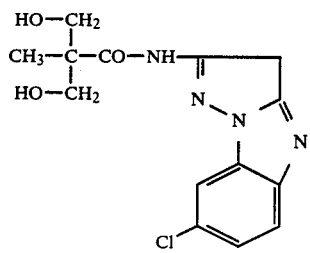 M-33
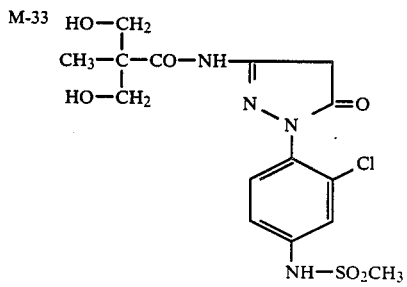 M-34
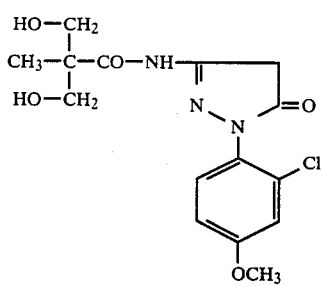 M-35
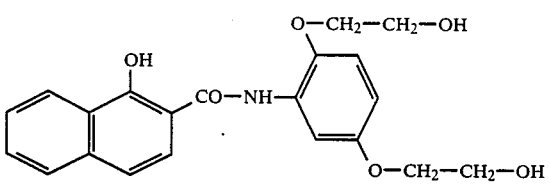 M-36
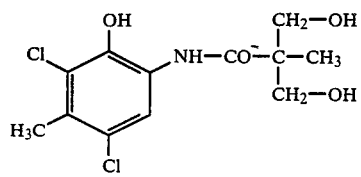 M-37
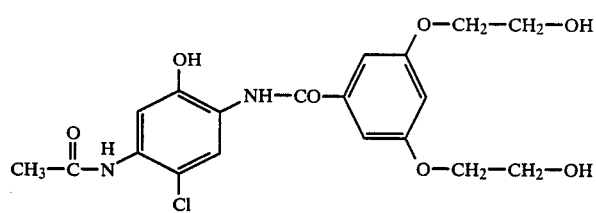 M-38
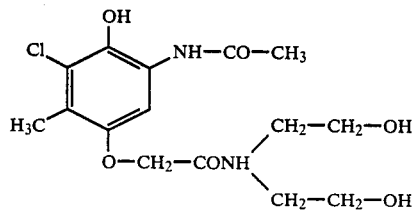 M-39
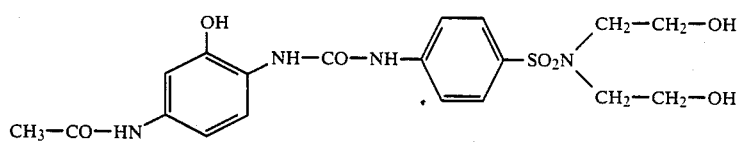 M-40

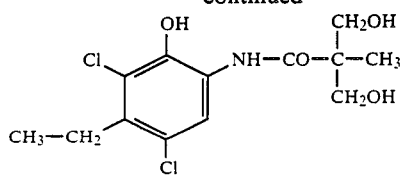
M-41
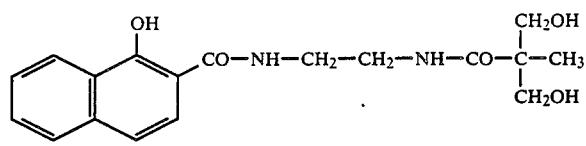
M-42
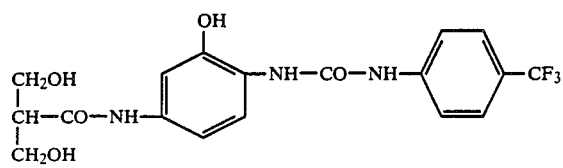
M-43
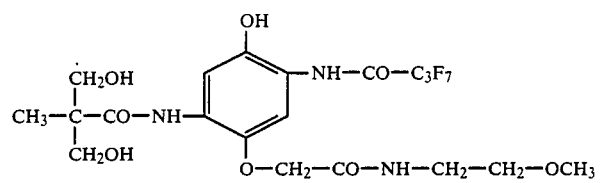
M-44
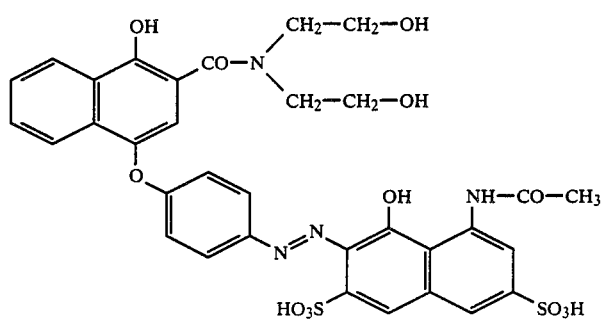
M-45
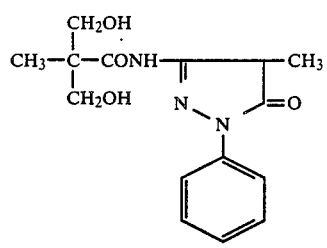
M-46
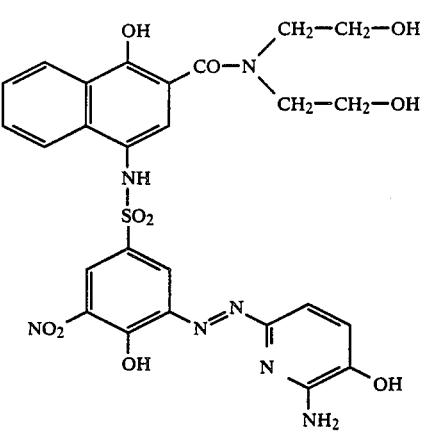
M-47
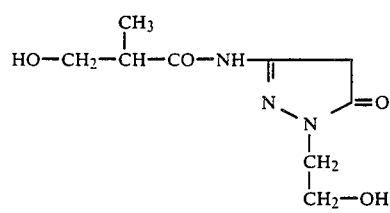
M-48

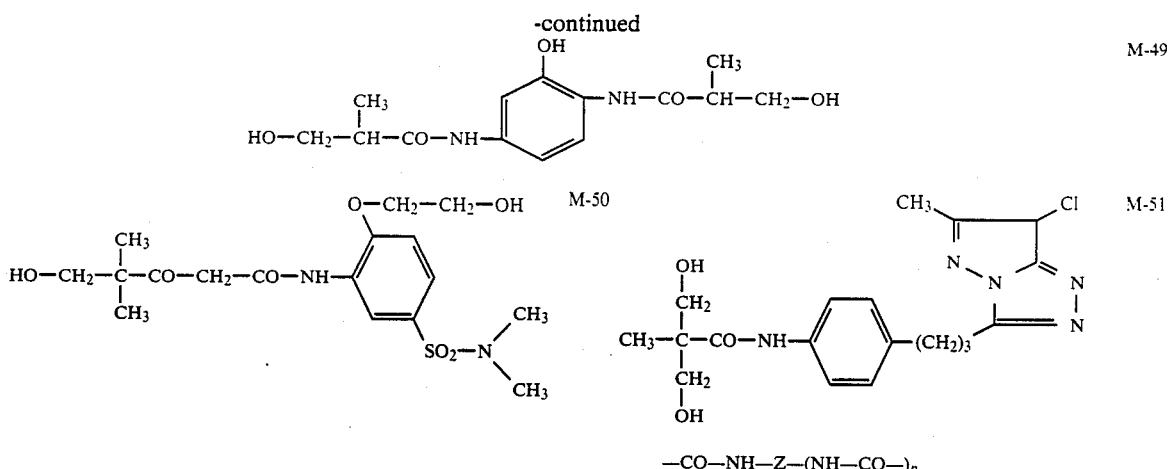

The compounds corresponding to formula III are synthesized by known methods. By way of explanation, the production of the monomeric dihydroxy compound M-12 (magenta coupler) is described in the following.

Step 1: 2,2-bis-acetoxymethyl propionic acid 268 g (2 moles) of 2,2-bis-hydroxymethyl propionic acid are refluxed for 10 hours in 800 ml of glacial acetic acid and 416 ml (4.4 moles) of acetic acid anhydride. The reaction solution is freed from the solvent in vacuo. The oily residue is stirred with 1500 ml of petroleum ether, the carboxylic acid ester is crystallizing out. It is filtered off under suction and washed with petroleum ether. Yield 420 g (96% of the theoretical); Mp. 85° C.

Step 2: 2,2-bis-acetoxymethyl propionic acid chloride 182 ml (2.5 moles) of thionyl chloride are poured over 218 g (1 mole) of 2,2-bis-acetonxymethyl propionic acid (step 1), followed by refluxing for 8 hours at a batch temperature of approximately 100° C. Excess thionyl chloride is distilled off in a water jet vacuum, leaving a pale yellow, oily product. Yield 236 g (100% of the theoretical).

Step 3: Compound M-12

111.4 g (0.4 mole) of 1-(2,4,6-trichlorophenyl)-3-amino-5-pyrazolone are suspended in 500 ml of acetonitrile, followed by the addition of 77.2 ml (0.8 mole) of pyridine. 189 g (0.8 mole) of 2,2-bis-acetonxymethyl propionic acid chloride are then added dropwise over a period of 20 minutes at room temperature. The aminopyrazolone passes into solution.

The reaction solution is then stirred into a mixture of 2.5 l of ice/water and 500 ml of concentrated hydrochloric acid. The aqueous phase is decanted off from oil. The oil is then stirred twice with water and decanted.

The crude, still moist oil is dissolved in 1000 ml of alcohol and first neutralized with 5N NaOH. 400 ml of 5N NaOH (2 moles) are then added to the solution at room temperature. After 30 minutes, the solution is treated with active carbon, filtered and acidified with acetic acid. The solution is then stirred into 5 liters of water. After 2 hours, the crystalline product is filtered off under suction and washed with water and methanol. A pale yellow crystallizate melting at 227°–229° C. is obtained in a yield of 86 g (54% of the theoretical).

In the high molecular weight polyadducts and polycondensates according to the invention, the individual structural elements corresponding to formulae I or II are attached to one another by recurring structural units corresponding to the following formula IV

in which Z is a (p+1)-valent organic linking member and p is a number $\geq 1$. Accordingly, the polyadducts and polycondensates according to the invention are polyurea or polyurethane compounds which, in addition, may have a polyether and/or polyester structure in the group Z and may optionally contain further ureido and/or urethane groups and also hydrophilic residues.

Suitable starting materials for the structural units corresponding to formula IV are compounds containing at least 2 isocyanate groups, such as monomeric polyisocyanates and mixtures thereof, polyfunctional so-called NCO-prepolymers and mixtures thereof and also mixtures of monomeric polyisocyanates and polyfunctional NCO-prepolymers (semiprepolymers). The monomeric polyisocyanates are primarily diisocyanates of the type also mentioned hereinafter as starting materials for the production of the NCO-prepolymers. The NCO-prepolymers are, for example, those which contain one or more hydrophilic group(s) responsible for their solubility or dispersibility in water. However, the exact chemical constitution of the NCO-prepolymers is not critical. This means in particular that any NCO-prepolymers which, hitherto, have been used in the production of aqueous polyurethane dispersions or solutions are suitable for use in accordance with the invention. They may be produced by any of the known methods described, for example, in DE-A-1 495 745, DE-A-1 495 847, DE-A-24 46 440, DE-A-23 40 512, U.S. Pat. No. 3,479,310, GB-A-1 158 088 or in GB-A-1 076 688.

The NCO-prepolymers containing chemically incorporated hydrophilic groups preferably used in the process according to the invention are produced analogously to the methods described in the literature references cited by way of example. Accordingly, starting materials for producing these NCO-prepolymers are 1. organic polyisocyanates, preferably diisocyanates corresponding to the following formula $$Z''(NCO)_2$$

in which Z" is a bivalent aliphatic hydrocarbon radical containing from 4 to 12 carbon atoms, a cycloaliphatic hydrocarbon radical containing from 6 to 15 carbon atoms, an aromatic hydrocarbon radical containing from 6 to 15 carbon atoms or an araliphatic hydrocarbon radical containing from 7 to 15 carbon atoms. Examples of diisocyanates such as these, which are preferably used in accordance with the invention, are tretramethylene disisocyanate, hexamethylene diisocyanate, dodecamethylene diisocyanate, 1,4-diisocyanatocyclohexane, 1-isocyanatro-3,3,5-trimethylisocyanatomethyl cyclohexane, isophorone diisocyanate, 4,4'-diisocyanatodicyclohexyl methane, 4,4'-diisocyanato-2,2-dicyclohexyl propane, 1,4-diisocyanatobenzene, 2,4-diisocyanatotoluene, 2,6-diisocyanatotoluene, 4,4'-diisocyanatodiphenylmethane, 4,4'-diisocyanato-2,2-diphenyl propane, p-xylylene diisocyanate or α,α,α', α'-tetramethyl-m- or -p-xylylene diisocyanate and mixtures of these compounds.

It is of course also possible to use the higher polyisocyanates known per se in polyurethane chemistry or even modified polyisocyanates known per se, for example polyisocyanates containing carbodiimide groups, allophanate groups, isocyanurate groups, urethane groups and/or biuret groups.

2. Any organic compounds containing at least two isocyanatereactive groups, but especially organic compounds containing in all two amino groups, thiol groups, carboxyl groups and/or hydroxyl groups and having a molecular weight in the range from 62 to 10,000, preferably in the range from 100 to 6000 and more preferably in the range from 500 to 4000. It is preferred to use the corresponding dihydroxy compounds. Compounds having a functionality of three or more in the context of the isocyanate polyaddition reaction may be used in samll quantities to obtain a certain degree of branching; the same purpose may also be served by the already mentioned possible use of trifunctional or higher polyisocyanates.

Preferred hydroxyl compounds are the hydroxy polyesters, hydroxy polyethers, hydroxy polythioethers, hydroxy polyacetals, hydroxy polycarbonates and/or hydroxy polyesteramides known per se in polyurethane chemistry. The polyesters containing hydroxyl groups suitable for use in accordance with the invention are, for example, reaction products of polyhydric, preferably dihydric and, optionally, even trihydric alcohols with polybasic, preferably dibasic, carboxylic acids. Instead of using the free carboxylic acids, it is also possible to use their anhydrides or esters with lower alcohols for producing the polyesters. The polybasic carboxylic acids may be aliphatic, cycloaliphatic, aromatic and/or heterocyclic and may optionally be substituted, for example by halogen atoms, and/or unsaturated. Examples of suitable polybasic carboxylic acids of this type are succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid anhydride, fumaric acid, dimeric and trimeric fatty acids, such as oleic acid, optionally in admixture with monomeric fatty acids, terephthalic acid dimethyl ester, terephthalic acid-bis-glycol ester. Suitable polyhydric alcohols are, for example ethylene glycol, 1,2- and 1,3-propylene glycol, 1,4- and 2,3-butylene glycol, 1,6-hexane diol, 1,8-octane diol, neopentyl glycol, 1,4-bis-hydroxymethyl cyclohexane, 2-methyl-1,3-propane diol, glycerine, trimethylol propane, 1,2,6-hexane triol, 1,2,4-butane triol, trimethylol ether, pentaerythritol, quinitol, mannitol and sorbitol, methyl glycoside, also diethylene glycol, triethylene glycol, tetraethylene glycol, polyethylene glycols, dipropylene glycol, polypropylene glycols, dibutylene glycol and polybutylene glycols. The polyesters may contain terminal carboxyl groups. Polyesters of lactones, for example ε-caprolactone, or hydroxy carboxylic acids, for example ω-hydroxy caproic acid, may also be used.

The polyethers preferably containing two hydroxyl groups which may also be used in accordance with the invention are known per se and are obtained, for example, by polymerizing epoxides, such as ethylene oxide, propylene oxide, butylene oxide, tetrahydrofuran, styrene oxide or epichlorohydrin on their own, for example in the presence of $BF_3$, or by the addition of these epoxides, optionally in admixture of successively, onto starter components containing reactive hydrogen atoms, such as alcohols and amines, for example water, ethylene glycol, 1,3- or 1,2-propylene glycol, 4,4'-dihydroxydiphenyl propane, aniline.

Polyethers modified by vinyl polymers, of the type formed for example by polymerization of styrene/acrylonitrile in the presence of polyethers (U.S. Pat. No. 3,304,273, U.S. Pat. No. 3,523,093, U.S. Pat. No. 3,110,695, DE-C-1 152 536), are also suitable. The higher polyethers which may optionally be used are analogously formed in known manner by alkoxylation of higher starter molecules, for example ammonia, ethanolamine, ethylene diamine or sucrose.

Suitable hydroy polythioethers are, in particular, the condensation products of thiodiglycol on its own and/or with other glycols, dicarboxylic acids, formaldehyde, aminocarboxylic acids or aminoalcohols. Depending on the cocomponents, the products are polythio mixed ethers, polythioether esters, polythioether esteramides.

Suitable hydroxy polyacetals are, for example, the compounds obtainable from glycols, such as diethylene glycol, triethylene glycol, 4,4'-diethoxy diphenyl dimethylmethane, hexane diol and formaldehyde. Suitable polyacetals can also be produced by polymerization of cyclic acetals.

The polycarbonates containing hydroxyl groups suitable for use in accordance with the invention are known per se and may be obtained, for example, by reaction of diols, such as 1,3-propane diol, 1,4-butane diol and/or 1,6-hexane diol, diethylene glycol, triethylene glycol, tetraethylene glycol, with diaryl carbonates, for example diphenyl carbonate, or phosgene.

The polyester amides and polyamides containing hydroxyl groups include, for example, the predominantly linear condensates obtained from polybasic, saturated and unsaturated carboxylic acids or their anhydrides and polyhydric, saturated and unsaturated aminoalcohols, diamines, polyamines and mixtures thereof. Polyhydroxyl compounds already containing urethane or urea groups may also be used.

Low molecular weight polyols may also be used. Suitable low molecular weight polyols are, for example, ethane diol, 1,2- and 1,3-propane diol, 1,4- and 1,3-butane diol, pentane diols, hexane diols, trimethylol propane, hexane triols, glycerine and pentaerythritol.

Representative of the above-mentioned polyisocyanates and polyhydroxyl compounds are described, for example in High-Polymers, Vol. XVI, "Polyurethanes, Chemistry and Technology" by Saunders-Frisch, Interscience Publishers, New York/London, Vol. I, 1962, pages 32–42 and 44–54, and Vol. II, 1964, pages 5–6 and 198–199, and also in Kunststoff-Handbuch, Vol. VII, Vieweg-Hochtlen, Carl-Hanser-Verlag, Munich, 1966, for example on pages 45 to 71.

3. Synthesis components containing chemically fixed hydrophilic groups and having a functionality of preferably one and, more especially, two in the context of the isocyanate addition reaction, of the type described by way of example in the above-mentioned literature references in relation to the production of aqueous polyurethane dispersions or solutions, i.e. for example diisocyanates, diamines or dihydroxy compounds containing ionic or potential ionic groups and diisocyanates or glycols containing polyethylene oxide units. Preferred hydrophilically modified synthetesis components include, in particular, the aliphatic diols containing sulfonate groups according to DE-A-24 46 440, the cationic or even anionic, incorporable internal emulsifiers according to DE-A-26 51 506 and also the monofunctional incorporable polyethers described therein. In the production of the NCO-prepolymers by methods known per se, the reactants are generally used in quantitative ratios corresponding to a ratio of isocyanate groups to NCO-reactive hydrogen atoms, preferably from hydroxyl groups, of from 1.05 to 10:1 and preferably from 1.1 to 3:1.

The individual reactants may be added in any order. Thus, the hydroxyl compounds may be mixed and the polyisocyanate subsequently added or, alternatively, a mixture of the hydroxyl compounds or the individual hydroxyl compounds may be gradually introduced into the polyisocyanate component.

Production of the NCO-prepolymers is preferably carried out in the melt at 30° to 190° C. and preferably at 50° to 120° C. The prepolymers may of course also be produced in the presence of organic solvents, although such solvents do not have to be used. Suitable solvents, which may be used in quantities of up to 30% by weight, based on solids, for example to reduce the viscosity of particularly high-melting prepolymers, would be, for example, acetone, methylethyl ketone, ethyl acetate, dimethyl formamide, cyclohexanone, dioxane, glycol dimethly ether, glycol ether acetates.

For the rest, the type of and quantitative ratios between the starting materials used in the production of the NCO-prepolymers are preferably selected so that the NCO-prepolymers (a) have an average NCO-functionality of from 1.8 to 2.2 and preferably of the order of 2, (b) contain from 0 to 100, preferably from 0.1 to 100 and, more preferably, from 0.5 to 50 milliequivalents of cationic or anionic incorporated groups per 100 g of solids, (c) contain from 0 to 30% by weight, preferably from 0.5 to 30% by weight and, more preferably, from 1 to 20% by weight, based on the total weight of the prepolymer, of ethylene oxide units present in a polyether segment and incorporated laterally, terminally and/or within the main chain, and (d) have an average molecular weight of from 500 to 10,000 and preferably of from 800 to 4000.

As already mentioned, preferred NCO-prepolymers are those which either contain ionic groups of the type mentioned under (b), i.e. in particular

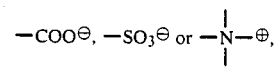

or nonionic groups of the type mentioned under (c) or both ionic and also nonionic groups of the above-mentioned type. However, NCO-prepolymers which have been produced without using any of the hydrophilic synthesis components mentioned under 3, i.e. in which the content of the groups mentioned above under (b) and (c) is nil, may also be used in the process according to the invention.

To produce the polyadducts and polycondensates according to the invention, dihydroxy or diamino compounds corresponding to formula III and, optionally, other organic compounds containing at least two isocyanate-reactive groups are reacted with organic polyisocyanates. The reaction may be conducted in such a way that a bifunctional or polyfunctional NCO-prepolymer is intitially prepared by reaction of the polyisocyanate with a first reactive compound and is then further reacted with a second reactive compound and, optionally, with a further reactive compound. The photographically useful compound corresponding to formula III may be used as the first, as the second or even as the further reactive compound. However, it is also possible to react the polyisocynate with a mixture of the reactive compounds containing inter alia the mole molecular weight photographically useful compound corresponding to formula III. The reaction conditions are familiar to the expert and are conditions under which polyurethanes and polyureas are normally produced. It is preferred to use methods of the type in which the polyadduct or polycondensate accumulates directly in the form of a dispersion or latex.

The reaction mixture is then mixed with water to prepare the aqueous solution or dispersion. To this end, it is best to use only a little water so that the solution or dispersion has a high solids content. Solutions or dispersions having solids contents of from 30 to 60% by weight may readily be prepared. Further dilution with water is readily possible. The water is preferably added all at once or gradually as required. However, the reaction mixture may also be mixed with water by introducing the mixture into the aqueous phase. The water used may have a temperature of, for example, from 0° to 90° C. and preferably from 15° to 60° C.

The dispersions formed are very finely divided, their constituent particles preferably ranging from 0 to 200 nm in size. However, the particles may of course even be larger.

Whether solutions or dispersions of the polyurethanes or polyureas in water are obtained in the process according to the invention depends above all on the molecular weight and hydrophilicity of the dissolved or dispersed particles which, in turn, may be adjusted by suitably selecting the type of, and quantitative ratios between, the starting materials, especially where the NCO-prepolymers are produced by known methods of polyurethane chemistry. For example, the use of an NCO-prepolymer having an average NCO-functionality only slightly below 2 results in termination of the polyaddition reaction before excessively high molecular weights are reached.

Instead of being produced with a single low molecular weight, photographically useful compound corresponding to formula III, the polyadducts and polycondensates according to the invention may also be produced with a plurality of those photographically useful compounds corresponding to formula III, in which case these various starting materials corresponding to formula III may differ in the meaning of Q. In this way, it is possible to combine different photographic functions (Q) in a single polymer without being subject to any stoichiometric limitations. For example, it is possible to combine in the polymer coupler units which give different dyes during the color coupling reaction in order in this way to produce a mixed color during the color coupling reaction. In addition, it is possible, besides color coupler units, to incorporate other structual units of a different function, for example white coupler or DIR-coupler units, in a polymer. Finally, it is also possible, for example, to combine structural units containing reducible dye relasing compounds and structural units containing electron donor precursor residues (masked reducing agents) in a polymer.

Latices of photographically useful compounds of small particle size and high dispersion stability are obtained by the polyaddition or polycondensation process according to the invention.

In the production of the photographic recording material, the polyadducts or polycondensates according to the invention may be incorporated in known manner in the casting solution of the silver halide emulsion layers or other colloid layers by addition, preferably in the form of aqueous dispersions of the type obtainable during production, to a hydrophilic colloid solution, optionally in the presence of a wetting agent or dispersant. In addition to the binder, the hydrophilic casting solution may of course also contain other standard additives.

The aqueous dispersion does not need to be directly dispersed in the casting solution for the silver halide emulsion layer or in any other water-permeable layer. Instead, it may even be initially dispersed with advantage in an aqueous non-photosensitive solution of a hydrophilic colloid and the resulting mixture subsequently mixed, optionally after removal of the organic solvent used, with the casting solution for the photosensitive silver halide emulsion layer or any other water-permeable layer before application.

Suitable photosensitive silver halide emulsion are emulsion of silver halide, silver bromide or mixtures thereof, optionally containing a small amount, i.e. up to 10 mole %, of silver iodide, in one of the hydrophilic binders normally used. The binder preferably used for the photographic layers in gelatin. However, the gelatin may be completely or partly replaced by other natural or synthetic binders.

The emulsions may be chemically or spectrally sensitized in the usual way and the emulsion layers and other non-photosensitive layers may be hardened in the usual way using known hardening agents.

The layers containing the polyadducts or polycondensates according to the invention and also other layers of the photographic recording material may contain further additives in the usual way, for example light stabilizers, UV absorbers, formalin binding agents, reducing agents, couplers and the like; these additives may be present in polymeric form or in low molecular weight form.

For producing color-photographic images, the photographic recording material according to the invention generally contains at least three silver halide emulsion layers and color couplers associated therewith; in this case, the corresponding color coupler is associated with at least one siliver halide emulsion layer in the form of one of the polyadducts or polycondensates according to the invention. The corresponding compound may be present either in the silver halide emulsion layer itself or in an adjacent, non-photosensitive binder layer. In this case, a color developer is used for development.

Suitable color developer compounds are any developer compounds which are capable of reacting with color couplers in the form of their oxidation product to form azomethine dyes. Suitable color developer compounds are aromatic compounds containing at least one primary amino group of the p-phenylene diamine type, for example N,N-dialkyl-p-phenylene diamines, such as N,N-diethyl-p-phenylene diamine, 1-(N-ethyl-N-methylsulfonamidoethyl)-3-methyl-p-phenylene diamine, 1-(N-ethyl-N-hydroxyethyl-3-methyl-p-phenylene diamine) and 1-(N-ethyl-N-methoxyethyl)-3-3methyl-p-phenylene diamine. Other silver halide developer compounds may also be used providing production of the color-photographic image is not based on chromogenic development.

EXAMPLE 1

Polyurethane yellow coupler latex A

A mixture of 68 g of hexane diol-neopentyl glycol polyadipate (MW 1700), 131 g of compound M-1 and 50 ml of anhydrous toluene are heated to approximately 100° C. A mixture of 37 g of isophorone diisocyanate and 28 g of 1,6-hexamethylene diisocyanate is then rapidly added dropwise at that temperature. The clear solution is kept at 105°-110° C. for 3 hours. After dilution with 720 ml of acetone, NCO titration reveals an NCO content of 3.3% (calculated 3.7% NCO).

A mixture of 18.4 g (50 mmoles) of an aqueous solution of the sodium salt of $\beta'$-aminoethyl-$\beta$-aminoethane sulfonic acid and 25 ml of water is added at 50° C. to 397 g of this solution. After about 10 minutes, the product is dispersed with 310 ml of deionized water and the solvent is removed in vacuo. A very finely divided, aqueous dispersion of the polyurethane-urea-modified coupler is obtained. The coupler has the following data:

particele size: 45 nm
pH: 7.2
solids content: 30%
equivalent molecular weight: 1615

EXAMPLE 2

Polyurethane yellow coupler latex B

The procedure is exactly the same as in Example 1, except that only 15.9 g (43 mmoles) of the sodium salt of $\beta'$-aminoethyl-$\beta$-aminoethane sulfonic acid are used.

Working up as in Example 1 gives a stable dispersion having the following data:

particle size: 230 nm
pH: 6.9
solids content: 30.2%
equivalent molecular weight: 1640

EXAMPLE 3

Polyurethane magenta coupler latex C

A mixture of 47.5 g isophorone diisocyanate and 37.6 g of 1,6-hexamethylene diisocyanate is reapidly added dropwise at 105° C. to a mixture of 85 g (0.05 mole) of hexane diol-neopentyl glycol polyadipate, 125 g of compound M-12 and 500 ml of dry toluene. After heating for 2 hours to 105°-110° C., the toluene is distilled off. The residue is dissolved in 689 g acetone. The NCO-content is measured at 2.7%.

A mixture of 50 ml of water and 40.1 g of a 51.6% aqueous solution of the sodium salt of $\beta'$-aminoethyl-$\beta$-aminoethane sulfonic acid is added to the acetone solution. After 10 minutes at 50° C., the product is dispersed with 675 ml of deionized water and the solvent is removed in vacuo.

A dispersion having the following data is obtained:
particle size: 375 nm
pH: 7.3
solids content: 30.4%
equivalent molecular weight: 1057

EXAMPLE 4

Polyurethane magenta coupler latex D 11 g of isophorone diisocyanate and 33.5 g of an NCO-prepolymer of hexane diol-nopentyl glycol polyadipate (molecular weight 1700) and 1,6-hexamethylene diisocyanate (NCO-content of the prepolymer 2.7%) are dissolved in 300 g of anhydrous 3-pentanone in the absence of moisture. A solution of 16.5 g of coupler diol M-12 in 250 g of 3-pentanone is then added, followed by stirring for 4 hours at boiling temperature, 7.2 g of a 49.3% aqueous solution of sodium ($\beta'$-aminoethyl)-$\beta$-aminoethane sulfonate are then added to the reaction solution and, after 15 minutes, 150 g of water are introduced dropwise. After removal of the solvent by distillation and dialysis, a finely divided polyurethane coupler latex having an equivalent molecular weight of 1587 is obtained.

EXAMPLE 5

Polyurethane magenta coupler latex E

The procedure is as described in Example 4, except that 22 g of the coupler diol M-13 are used instead of coupler diol M-12. A finely divided polyurethane magenta coupler latex having an equivalent molecular weight of 1724 is obtained.

EXAMPLE 6

Polyurethane yellow coupler latex F 1.8 g of isophorone diisocyanate and 6.7 g of the prepolymer described in Example 4 are dissolved in 60 g of 3-pentanone in the absence of moisture. 6 g coupler diol M-4 dissolved in 50 g of 3-pentanone are then added at room temperature, followed by stirring for 3 hours at boiling temperature. 1.8 g of a 49.3% aqueous solution of $\beta'$-aminoethyl-$\beta$-aminoethane sulfonic acid is then added to the reaction solution and, after 15 minutes, 30 g of water are introduced dropwise over a period of 3 minutes. After removal of the solvent by distillation in a rotary evaporator and dialysis, a finely diveded polyurethane yellow coupler latex having an equivalent molecular weight of 1925 is obtained.

EXAMPLE 7

Polyurethane magenta coupler G

A mixture of 35.1 g of hexamethylene diisocyanate and 46.4 g of isophorone diisocyanate is rapidly added dropwise at 100° C. to a mixture of 126 g (0.074 mole) of hexane diolneopentyl glycol polyadipate, 93 g of compound M-12 and 400 ml of dry dioxane. After heating for 2 hous at 100°–108° C., the NCO-content amounts to 2.9% (calculated: 3.0%). The dioxane is distilled off in vacuo and replaced by 740 ml of acetone. A mixture of 21 g of a 51.6% aqueous solution of the sodium salt of $\beta'$-aminoethyl-$\beta$-aminoethane sulfonic acid and 50 g of water is then added at approximately 45° C. After 10 minutes, the product is dispersed with 830 ml of deionized water. The acetone is then removed in vacuo, leaving a finely divided, storable dispersion having the following data:
particle size: 115 nm
pH: 6.5
solides content: 28%
equivalent molecular weight: 1323

The aqueous dispersions of the polyadducts and polycondensates according to the invention are incorporated in the layers of photographic recording materials by standard methods familiar to the expert. To this end, a latex prepared as described above is added to a casting solution for a photosensitive or non-photosensitive layer and thoroughly mixed therewith, after which the mixture is cast to form the layer. The casting solution generally contains a hydrophilic colloid, preferably gelatin, as binder. However, by virtue of their high dispersion stability, the polyadducts and polycondensates according to the invention may also be cast to form low-binder layers or substantially binder-free layers.

EXAMPLE 8

The polyurethane magenta coupler latices D and E (Examples 4 and 5) and the comparison coupler A were added to various samples of a silver halide emulsion which had been sensitized for blue or green in accordance with the color coupler introduced. The silver halide gelatin emulsion used consisted of 75 g of silver bromide iodide (iodide content 3 mole %) and 72 g of gelatin per kg of emulsion.

The emulsions thus prepared were applied to a cellulose triacetate layer support coated with an adhesive layer and dried.

Photographic testing:

The individual samples were exposed by means of a sensitometer and then processed as described below. Tests were conducted to determine relative sensitivity, gradation ($\gamma$), color yield and stability of the color-photographic image during storage of the processed recording materials under different conditions (reduction in color density).

Storage 1: 7 days at 77° C./5% relative humidity
Storage 2: 7 days at 60° C./saturated humidity
 a: measured at maxiumum density
 b: measured at density 0.5

Processing baths:
 Color developer A
 Sodium metaphosphate: 2 g
 Sodium sulfite, anhydrous: 2 g
 NaOH, 10%: 5 ml
 Soda anhydrous: 50 g
 Potassium bromide: 1 g
 N-ethyl-N($\beta$-methane sulfonamido)-ethyl-4-amino-3-methyl aniline sesqisulfate: 5 g
 Benzyl alcohol: 3 ml
 Water: to 1000 ml
 pH: 10.75
 Bleaching bath
 Water dist.: 300 ml
 Ammonium-iron-EDTA-solution, 50%: 320 ml
 Ammonium Bromide: 300 g
 Acetic acid, 80%: 28 ml
 Water: to 1000 ml
 Fixing bath concentrate (diluted 1:3 with water)
 Water dist.: 140 ml Ammonium thiosulfate solution, 56–60%: 760 ml
EDTA acid: 6.0 g
Sodium sulfite: 119.3 g
Sodium disulfite: 7.0 g
Ammonia water 25%: 6 ml
Water dist.: to 1000 ml
Stop bath
Sodium acetate: 10 g
Glacial acetic acid: 20 ml
Water: to 1000 ml
Color Developer B
Water dist.: 800 g
Disodium salt of hydroxyethane diphosphonic acid: 2 g
Disodium salt of ethylene diamine tetracetic acid: 2 g
Potassium carbonate: 34 g
Sodium hydrogen carbonate: 1.55 g
Sodium disulfite: 0.28 g
Sodium sulfite: 3.46 g
Potassium bromide: 1.34 g
Hydroxylamine sulfate: 2.4 g
N-ethyl-N-($\beta$-hydroxy)-ethyl-4-amino-3-ethyl aniline sulfate: 4.7 g
Water dist.: to 1000 ml

| Processing | Processing (mins) | |
|---|---|---|
| | A (21° C.) | B (25° C.) |
| Color development A | 15 | — |
| Color development B | — | 10 |
| Stop bath | 2 | 4 |
| Intermediate rinse | 10 | 5 |
| Bleaching bath | 8 | 5 |
| Intermediate rinse | 5 | 5 |
| Fixing bath | 5 | 5 |
| Final rinse | 10 | 10 |

Comparison latex coupler A $X/Y = 65/35\%$ by weight

Comparison coupler B

TABLE 1

| Polyurethane Magenta coupler latex | Processing | E | $\gamma$ | Colour yield | Reduction in color density $\frac{\Delta D}{Do} \cdot 100$ | | | |
|---|---|---|---|---|---|---|---|---|
| | | | | | 1a | 1b | 2a | 2b |
| E | A | 95 | 0.50 | 1.30 | 4 | 8 | 3 | 3 |
| E | B | 97 | 0.47 | 1.47 | 5 | 4 | 0 | 0 |
| D | A | 90 | 0.45 | 1.37 | 5 | 8 | 4 | 0 |
| D | B | 93 | 0.45 | 1.45 | 6 | 10 | 3 | 8 |
| Comparison latex coupler A | A | 97 | 0.50 | 1.33 | 10 | 32 | 6 | 28 |
| Comparison latex coupler A | B | 93 | 0.40 | 1.49 | 16 | 34 | 12 | 32 |

Remarks:
E = rel. sensitivity; a smaller number signifies greater sensitivity
$\gamma$ = gradation
Reduction in color density:
1: after storage (7 d, 77° C., 5% r.H)
2: after storage (7 d, 60° C., saturated humidity)
a: measured at maximum density
b: measured at density 0.5

Table 1 shows that the polyurethane magenta coupler latices according to the invention are substantially comparable in sensitometric data with the prior art coupler, but are distincltly superior in storage behavior under moist and dry conditions.

EXAMPLE 9

In another test, the polyurethane yellow coupler latex F and the comparison coupler B in the form of a dibutyl phthalate emulsion in aqueous gelatin with a ratio of dibutyl phthalate to comparison coupler B of 1:1 are cast onto a support, exposed and processed in the same way as described in Example 1. There were no significant differences in the sensitometric data. In addition, the samples were exposed with and without a UV-absorbing film (UV-absorbing film containing a 2-hydroxyphenyl benztriazole derivative as UV absorber) to the light of a xenon lamp standardized for daylight and exposed with $2.4 \times 10^6$ lux.h. The percentage reductions in color density $\Delta D/Do$ indicated in Table 2 were measured.

TABLE 2

| Coupler | Pro-cessing | ΔD/Do · 100 | | | |
|---|---|---|---|---|---|
| | | without UV-screening | | with UV-screening | |
| | | D = 0.5 | Dmax | D = 0.5 | Dmax |
| Polyurethane yellow coupler latex F | A | 25 | 10 | 8 | 6 |
| | B | 22 | 5 | 12 | 5 |
| Comparison coupler B | A | 32 | 10 | 20 | 5 |
| | B | 46 | 22 | 29 | 9 |

Table 2 shows that the polyurethane yellow coupler latex according to the invention shows greater stability to harmful irradiation than the comparison coupler.

EXAMPLE 10

This Example demonstrates the effect of the polyurethane yellow coupler latex F according to the invention on the breakage behavior of photographic recording materials.

A photographic emulsion layer consisting of a silver bromide emulsion, a dispersion prepared in accordance with the invention or the comparison emulsate of Example 2, gelatin and a hardener, was formed on a prepared cellulose triacetate film support and dried. After drying, the layer of the comparison material contained 30% by volume of AgBr, 15% by volume of comparison coupler B, 15% by volume of dibutyl phthalate and 40% by volume of gelatin. In the recording material according to the invention, the comparison coupler B and dibutyl phthalate were replaced by polyurethane yellow coupler latex F in an equivalent quantity as measured in coupler units. 36 mm wide strips of these recording materials were assimilated for 3 days at 17° C./20% r.H. Measurement was carried out by the loop method, in which the test specimens were made into a loop and circulated around 3 rollers arranged in the form of a triangle. The number of circuits completed by the film before breakage is then determined and compared with the corresponding value of a material which had been prepared in the same way as described above, but with 30% by volume of AgBr and 70% by volume of gelatin as layer constituents. The measurements produced the following result:

| | Number of circuits before breakage of the material |
|---|---|
| Polyurethane yellow coupler latex F | 225 |
| Comparison coupler B, emulsified 1:1 with dibutyl phthalate | 22 |
| Gelatin | 3.5 |

The test shows the use of the polyurethane latex coupler according to the invention improves the breakage behavior of photographic recording materials compared with that of corresponding materials containing emulsified color couplers.

We claim:

1. A photographic recording material comprising at least one photosensitive silver halide emulsion layer, characterized by a content of a polyurea or a polyurethane compound optionally having polyester and/or polyether structures, wherein the polyurea or polyurethane compound contains recurring structural units corresponding to the following formula II

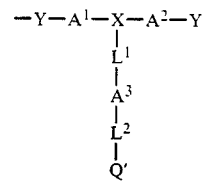

in which

Q', either on its own or together with X (with inclusion of —L$^1$—A$^3$—L$^2$—), represents the essential part of a photographic redox compound or of a coupler capable of reacting with developer oxidation products to produce colored or non-colored reaction products in imagewise distribution, X represents —CR$^2$—, —N—,

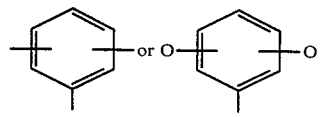

Y represents —O— or —NR$^1$—,

A$^1$ and A$^2$ represents C$_1$–C$_4$ alkylene,

A$^3$ represents C$_1$–C$_8$ alkylene, arylene or a chemical bond,

L$^1$ represents —CONH—, —NHCO—, —CO—, —SO$_2$—, —O— or a chemical bond,

L$^2$ represents —CONH—, —NH—, —O—, or a chemical bond,

R$^1$ represents H, C$_1$–C$_6$ alkyl, cycloalkyl or phenyl and

R$^2$ represents H or C$_1$–C$_4$ alkyl.

2. A photographic recording material as claimed in claim 1 wherein the polyurea or polyurethane compound contains recurring structural units corresponding to the following formula

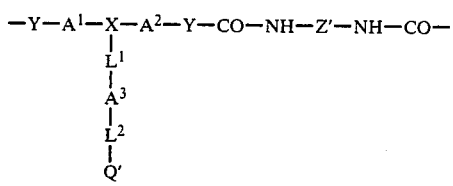

Z' represents the bivalent residue of a diisocyanate compound.

3. A photographic recording material as claimed in claim 1 wherein Q' in formula II represent part of a molecule capable of reacting with developer oxidation products.

4. A photographic recording material as claimed in claim 3, characterized in that Q' in formula II represents a residue of a yellow, magenta, cyan or white coupler.

* * * * *